Oct. 17, 1944.   R. D. EATON ET AL   2,360,660
WELDED STRUCTURE AND MEANS AND METHOD OF WELDING
Filed Jan. 20, 1943
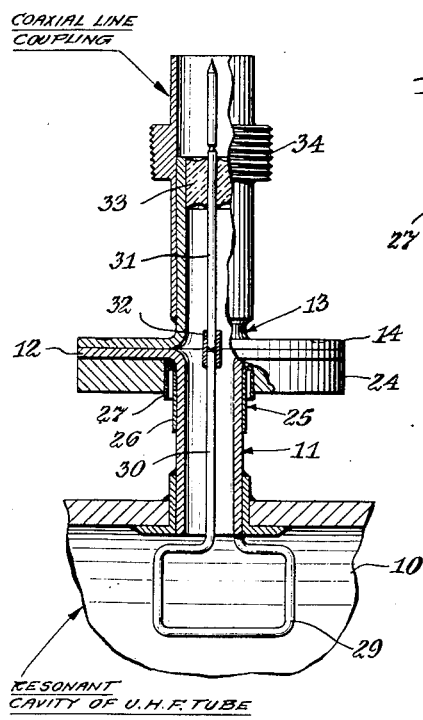
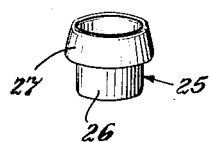
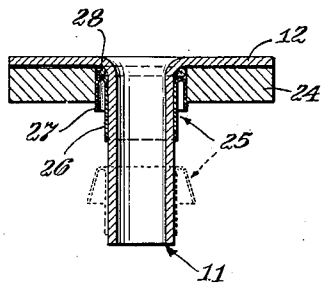
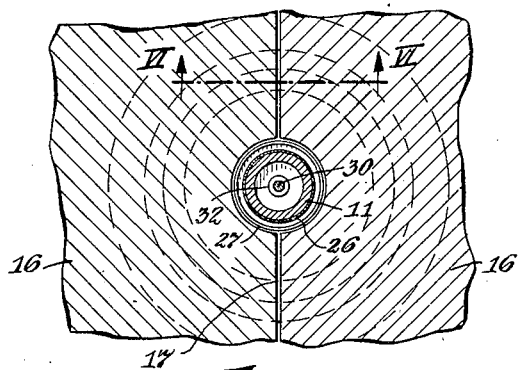
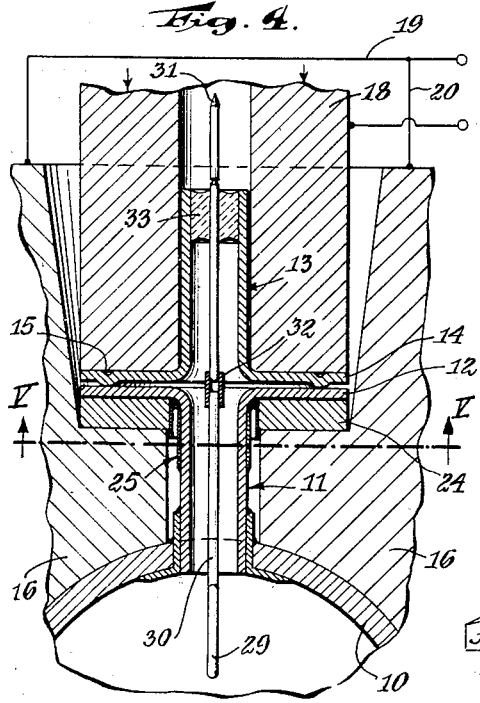
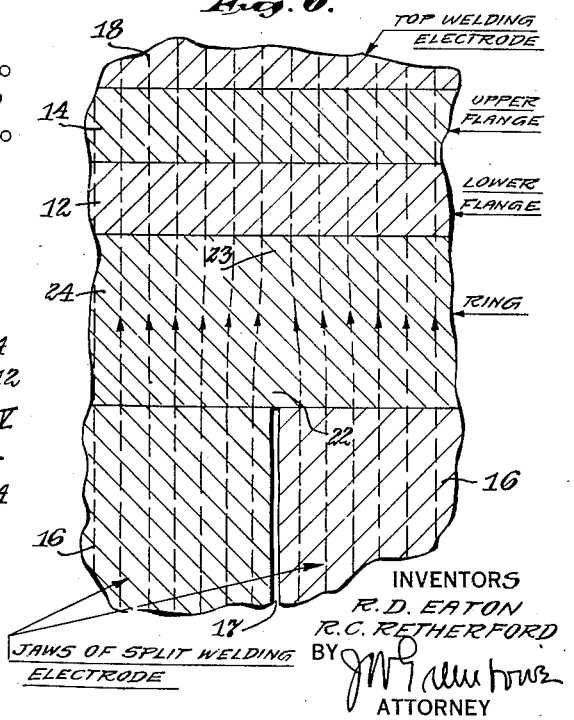
INVENTORS
R. D. EATON
R. C. RETHERFORD
BY
ATTORNEY Patented Oct. 17, 1944

2,360,660

UNITED STATES PATENT OFFICE 2,360,660

WELDED STRUCTURE AND MEANS AND METHOD OF WELDING

Roland D. Eaton, New York, N. Y., and Robert C. Retherford, Newark, N. J., assignors to Westinghouse Electric & Manufacturing Company, East Pittsburgh, Pa., a corporation of Pennsylvania Application January 20, 1943, Serial No. 472,968

5 Claims. (Cl. 250—27.5)

This invention relates to welded structure and means and method of welding, and more particularly has reference to the welding of such parts as eyelets forming part of the envelope of an evacuated instrumentality and especially of an evacuated electron discharge device.

In various evacuated structures, the use of an eyelet or flanged sleeve for lead-in wires, output connections and other purposes, is often used. Instances exist where it becomes necessary to utilize a split jaw as one of the electric welding electrodes in order that the jaw may be applied to surround the stem of the eyelet and have a position between the body of the envelope and the flange on the stem. It has been found, however, that welded joints made with a split-jaw electrode have a prevailing tendency to be leaky. This circumstance is intolerable and study of the cause has led to the conclusion that the split in the jaw results in a diminution in the current density in the neighborhood of the split so that this region receives less heat than parts not close to the split. The general current flow pattern in the vicinity of the split is shown in Fig. 6 of the accompanying drawing. All known attempts heretofore to overcome the deficiencies of welding such structures with a split jaw electrode have failed to accomplish uniformly vacuum-tight joints.

The invention accordingly has as its general objective provision of means and method and welded structure for correcting the deficiencies of electric welding by a split jaw electrode.

More specifically, an object of the invention is to provide a means and method which obtains adequate current density opposite the electrode split for effecting the weld thereat.

Another object of the invention is to uniformly weld a circular joint without leaving unwelded gaps.

Still further objects of the invention will appear as the description progresses, both by direct recitation thereof and by implication from the context.

Referring to the accompanying drawing in which like numerals of reference indicate similar parts throughout the several views:

Figure 1 is a view partly in elevation and largely in section showing a welded structure embodying the features of the present invention;

Figure 2 is a perspective view of a resilient collar constituting part of the structure utilized in the assembly;

Figure 3 is a diametric-longitudinal section of the eyelet prepared for welding;

Figure 4 is a sectional view of the eyelet, instrumentality to which the eyelet is to be welded, and welding electrodes ready to effect the weld;

Figure 5 is a sectional view on line V—V of Fig. 4; and

Figure 6 is a magnified sectional view on line VI—VI of Fig. 5.

In the specific embodiment of the invention illustrated in said drawing, the reference numeral 10 designates an instrumentality, such as the shell of a hollow body resonator of an ultra frequency electron discharge device, to which an eyelet 11 is secured and from which said eyelet projects with the flange 12 of the eyelet at the outer end thereof. For convenience of reference said eyelet will be identified as the fixed eyelet to distinguish it from a second eyelet 13 having a flange 14 to be welded to the flange of the fixed eyelet. The objective is to secure these flanges together by projection welding, for which reason one of the flanges, as 14, is provided with an annular projection 15 from its face toward the other flange 12. A split jaw electrode, the jaws 16 of which meet on a split junction 17 in a plane normal to the flanges and diametric with respect to the eyelets, may be brought to a position between the flange 12 of the fixed eyelet and the shell of the device to which the eyelet is fixed. It will be recognized that it is due to the fixed condition of the eyelet and protruding nature of the device and the flange from the stem of the eyelet that necessitates utilization of a split electrode to accomplish the desired placement of the electrode beneath the eyelet and to permit subsequent removal of said electrode. A cooperating electrode 18, shown of tubular construction, can be slid over the outwardly projecting stem of the second eyelet so that the end of said electrode bears flatwise upon the flange 14 of that eyelet. Welding is accomplished by flow of appropriate weld-producing current from an appropriate source through suitable lead wires 19, 20 to the respective electrodes.

It has been found that a line of poor weld, or no weld at all, occurs in immediate juxtaposition to the split between the jaws of the split jaw electrode. By reference to Fig. 6, the theoretical explanation of this circumstance is that in the region of the split the current flow lines spread out thereby reducing the current density in the vicinity of the slit. Inasmuch as the heat produced per unit volume is proportional to the square of the current density, it is clear that region 22 immediately above the split 17 is a region of low heating. The wider the split 17, the lower the current density in region 22 and the further region 22 extends upward towards the lower flange 12. If ring 24 is made thick enough so that the current density in region 23 is rendered not appreciably different from that at some distance to the right or left of the split and the upper and lower flanges thereabove will be uniformly heated.

Thus to overcome the ill effects of the reduced current density in the vicinity of the slit, we interpose a ring 24 of sufficient thickness and high enough conductivity that the current density is substantially uniform at the juxtaposed faces of the flanges.

This ring is preferably applied to the flange before the eyelet is mounted in final position and is brazed or otherwise secured to the flange before proceeding with the welding of the flanges together. As shown, the central orifice of the ring is somewhat larger than the eyelet stem and permits insertion of a resilient collar 25 therein. Said collar is preferably of thin resilient metal with an inner sleeve portion 26 substantially fitting the stem, an end 27 of the sleeve folding backward and flaring somewhat. The folded end of the collar may therefore be forced into the orifice of the ring, thereby compressing the flare of the folded back portion and causing the sleeve portion to hug the stem while the flare portion engages the ring very tightly. An annulus 28 of brazing material is inserted above the collar before pressing the collar home. The ring thus is temporarily held in position next the flange by the collar and the brazing material is likewise retained in its desired position by the collar. By placing the device 10, with eyelet, ring and collar assembled therewith, in a brazing furnace, the parts mentioned will be permanently secured together. The collar keeps the brazing material from escaping along the stem and as a result the brazing material fills the crevice between the contiguous flat faces of the flange and ring. Unification of flange and ring thus obtained insures practically unimpaired electrical conduction throughout the entire face area of the ring toward the flange. It is also at this stage of assembly that the loop 29 and coaxial rod 30 thereon are mounted in place in the device and in the fixed eyelet.

The second eyelet at this stage of assembly may now be applied in position upon the fixed eyelet. The specific showing provides a coaxial terminal prong 31 within the said second eyelet and the end thereof within the flanged end of the eyelet is inserted in an appropriate socket 32 on the contiguous end of the coaxial rod 30 in the fixed eyelet. The electrodes are then applied, the split jaws 16, 16 underlying the ring 24 and electrode 18 seating over the upper eyelet 13 on the flange 14 thereof. Welding current applied thereto passes substantially unhindered through the brazed joint and since the neutral region caused by the split of the jaws is entirely within the ring, the weld between flanges is continuous and unimpaired by presence of the split in the electrode. Glass bead 33 in the upper eyelet completes the vacuum seal for the eyelets and shell or envelope of the high frequency device of which the eyelets now form a part. After completion of the weld and removal of the welding electrodes, a coaxial coupling member 34 is secured to the outer or second nipple as by soldering or otherwise.

While the invention has been disclosed in conjunction with one specific embodiment thereof arbitrarily selected to illustrate the same, it is deemed within the scope of the invention to substitute equivalent parts and to vary the order of performing the method and reduce or enlarge upon the steps employed.

We claim:

1. A high frequency electron discharge device having a wall, an eyelet projecting therefrom, a flange on the eyelet spaced from said wall of the device, and a ring interposed between said flange and wall and juxtaposed to said flange and spaced from said wall whereby a split jaw electrode may be inserted between said wall and ring for effecting a weld of said flange and ring.

2. An evacuated electron discharge device having an eyelet opening thereinto, a second eyelet alined with the first said eyelet, said eyelets being welded together vacuum tight throughout juxtaposed annular areas, said eyelets being hollow and under the same vacuum as the electron discharge device, and means in the second said eyelet closing the same vacuum tight.

3. A high frequency electron discharge device having a wall, an eyelet projecting therefrom, a flange on the eyelet spaced from said wall of the device, and a ring interposed between said flange and wall and juxtaposed to said flange and spaced from said wall whereby a split jaw electrode may be inserted between said wall and ring for effecting a weld of said flange and ring and said ring being secured to said flange throughout an annular area thereof.

4. An electron discharge device having an eyelet secured thereto, said eyelet having a flange, a ring on the eyelet next said flange, and a collar resiliently engaging the ring and eyelet and retaining the ring in place on the eyelet.

5. An electron discharge device having an eyelet secured thereto, said eyelet having a stem and a flange, a ring having an orifice larger than said stem, said stem passing through said orifice, a resilient collar having a sleeve portion engaging said stem and a turned-back portion engaging said ring, and brazing material between the flange and ring retained from passing through the orifice of the ring by presence of said collar in said orifice.

ROLAND D. EATON.
ROBERT C. RETHERFORD.